United States Patent Office 3,679,420
Patented July 25, 1972

---

3,679,420
TWO COMPONENT DIAZOTYPE WITH AZO COUPLER
Taizo Yokoyama, Asahi-ku, Osaka, Japan, assignor to Mita Industrial Company Limited, Osaka, Japan
No Drawing. Filed Aug. 5, 1969, Ser. No. 847,702
Claims priority, application Japan, Aug. 7, 1968, 43/55,677
Int. Cl. G03c 1/58
U.S. Cl. 96—91 R    9 Claims

ABSTRACT OF THE DISCLOSURE

A copying material comprising as an azo coupling component a compound of the general formula $$Z_1-NH-\underset{X}{\underset{\|}{C}}-NH-Z_2$$

wherein X is =O, =S, or =N—$Z_3$; $Z_2$ is an oxyaryl group or a group expressed by the formula $$-Z_4-NH-\underset{X}{\underset{\|}{C}}-NH-Z_5$$

wherein $Z_4$ is an arylene group, each of $Z_1$ and $Z_5$ is an oxyaryl group; $Z_3$ is hydrogen, an alkyl group, an oxyalkyl group or an oxyaryl group; the oxyaryl or arylene groups optionally having a further substituent.

---

This invention relates to a copying material, especially a diazo-type copying material, which contains as coupling component an aromatic oxy compound having a urea, thiourea or guanidine skeleton.

As the coupling component of the diazo-type copying material, heretofore used are phenols such as phenol, resorcinol, phloroglucinol and tetrahydroxydiphenyl, their derivatives, hydroxy compounds of naphthalene such as R acid, NW acid, dioxynaphthalenesulphonic acid, 2,3-hydroxylnaphthoic acid ethanolamide, H acid, SS acid, γ acid and J acid, compounds containing an active methylene group such as acetoacetic acid anilide and heterocyclic compounds such as 1-phenyl-3- methyl pyrazolone (5). Copying materials obtained by using these coupling components have many defects yet to be removed in such properties as color, contrast, light fastness, resistance to oxidation and waterproofness. If, for instance, phenol, naphthol or naphtholsulphonic acid is used as the coupling component, an azo dye which forms an image becomes a monoazotype, yielding a copy with a light color and a dull contrast.

When compounds having two or more hydroxyl groups, such as resorcinol, phloroglucinol, dioxynaphthalenes and tetrahydroxyldiphenyl are used as the coupling component, the rate of the coupling is high and a disazo dye or a trisazo dye tends to be formed. Although this provides a deep color, the hydroxyl groups affect each other and the copy tends to be degenerated on air oxidation. If such a coupling component is used as a developer for a wet-method copying, it is already oxidized while being dissolved in the developer and colors and contaminates a photo-sensitive paper, resulting in impairing the finished copy. Furthermore, both in a wet-method copying and in a dry-method copying, the azo coupling component adhered to the background of the finished copy is gradually colored owing to oxidation and impairs the vividness of a reproduced image.

The aminonaphtholsulphonic acids such as S acid, γ acid, J acid, SS acid and H acid, when used in conjunction with diazonium salts, give a blue image. These primary amines are remarkably oxidized in solution or in the background of the finished copy, giving a yellow to yellowish brown color. This naturally affects the vividness of the reproduced image, and makes it difficult or even impossible to preserve the copy.

On the other hand, naphthol sulphonic acids such as NW acid and R acid which are less susceptible to degeneration give dyestuffs having a sulphonic acid group. For this reason, the reproduced image has a poor fastness to water and this poses a problem in preserving copies of important documents.

Copies obtained by using the above-mentioned azo coupling components further have the disadvantage of being poor in fastness to sunlight owing to the structure of the formed dyestuff, and when they are exposed to sunlight or artificial light, the density of the reproduced image becomes lower and in an extreme case, the reproduced image disappears. The combination of a diazonium salt and an azo coupling component heretofore used includes principally a one component type used in a wet-method developing and a two component type used in a dry-method developing. In recent years, a two component type containing only an alkali agent in a developer has been used both in the dry and wet methods. The defects of these copying materials have not been completely eliminated although attempts have been made to minimize them by selecting proper combinations of the diazonium salts and the azo coupling components or by adding adjuvants such as reducing agents and brightening agents.

In other words, a copying material which gives a deep color is liable to be degenerated by air oxidation; a copying material which gives a waterproof copy has only a small solubility in water, and therefore constitutes a setback against the preparation of the copying material or the production of copies; and a copying material in which the coupling rate is fast remarkably deteriorates the vividness of the finished copies. Thus, the known diazo type copying materials cannot be free from any of these defects.

It has now been found that the above-mentioned defects of the known diazo type copying materials can be removed by using a specific compound having a urea, thiourea or guanidine skeleton and containing at least two aromatic rings with hydroxyl groups in the preparation of a diazo type copying material; accordingly, the so prepared copying material gives copies which have a reproduced image with a vivid color and a good contrast, remarkably improved sunlight fastness, resistance to oxidation and waterproofness, and can be preserved stably over a long period of time; and that the aforementioned aromatic compound can be combined with a wide range of diazonium salts and is applicable to any developing method such as a dry method, wet method and heat developing method.

According to the present invention, a copying material is provided comprising as a coupling component a compound expressed by the general formula $$Z_1-NH-\underset{X}{\underset{\|}{C}}-NH-Z_2 \qquad (I)$$

wherein X is =O, =S or =N—$Z_3$ group; $Z_2$ is $Z_1$ or a grouping $$-Z_4-NH-\underset{X}{\underset{\|}{C}}-NH-Z$$

wherein $Z_4$ is an arylene group; each of $Z_1$ and $Z_5$ is an oxyaryl group; $Z_3$ is a hydrogen atom, an alkyl group, an oxyalky group or an oxyaryl group; these oxyaryl or arylene groups may have other substituents besides the oxy group.

The oxyaryl group represented by $Z_1$, $Z_2$, $Z_3$ and $Z_5$ in the foregoing Formula I may be any aromatic group having an oxy group such as oxyphenyl group, oxynaphthyl group, oxydiphenyl group, oxyanthranyl group, oxycarbazole group and oxydibenzofuran group, particularly preferable being an oxyphenyl group and oxynaphthyl group. These oxyaryl groups may be replaced by other substituents besides the oxy group, for instance substituents usually present in the coupling components used in the field of azo dyes, such as a sulphonic acid group, a carboxy group, a —SO₃M group (M being an alkali metal or NH₄), —COOM group, an alkyl group, an alkoxy group, an aryloxy group, a halogen atom, a sulphonamide group, a carbonamide group, a nitro group, an alkoxycarboxyl group, a haloalkyl group, a vinyl group, an N-alkyl or arylamino group, and an N-acylamino group. In the present invention, the sulphonic acid group, carboxyl group, —SO₃M group and —COOM group are preferred as the substituents in order to impart solubility in the developer to the compound of Formula I and enhance its affinity for a paper base. The arylene group represented by $Z_4$ in the foregoing general Formula I may be a phenylene group, a diphenylene group, a terphenylene group or a group expressed by the formula

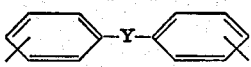

wherein Y is an alkylene group, O, S, >CO, >CS, —CONH—, —SONH or SO₂.

Preferable arylene groups are a phenylene group and a diphenylene group. These arylene groups may have an oxy group and/or the above-mentioned substituents.

Especially preferred examples of the compounds according to the present invention are given below.

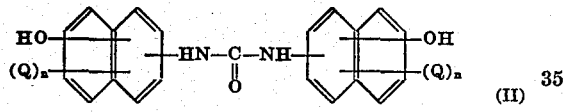

(wherein Q is H, —SO₃H, —SO₃M, —COOH or —COOM and n is 1–2)

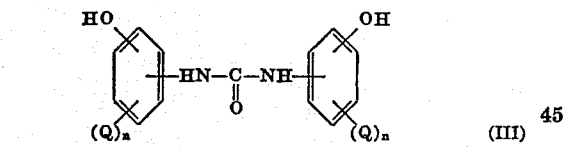

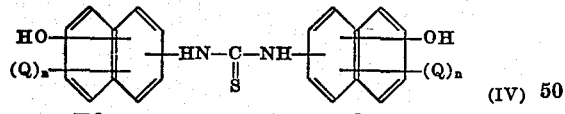

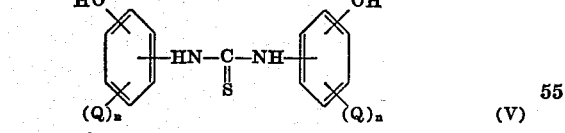

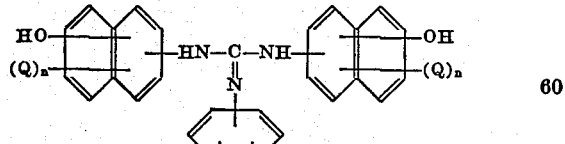

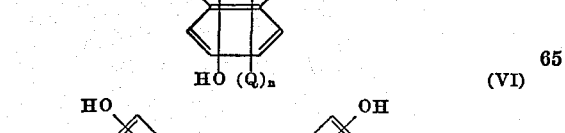

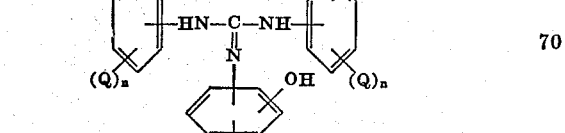

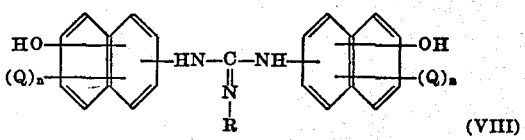

(R: hydrogen, alkyl or oxyalkyl)

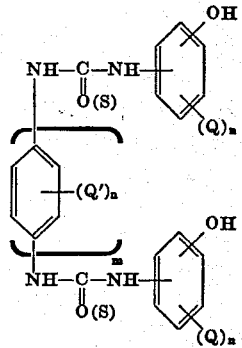

(m: 1 or 2; Q': oxy group, SO₃H, SO₃M, COOH, COOM, alkyl group, or alkoxy group)

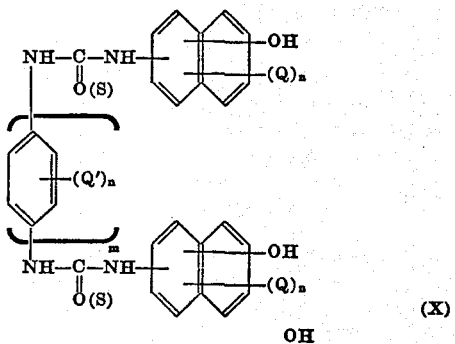

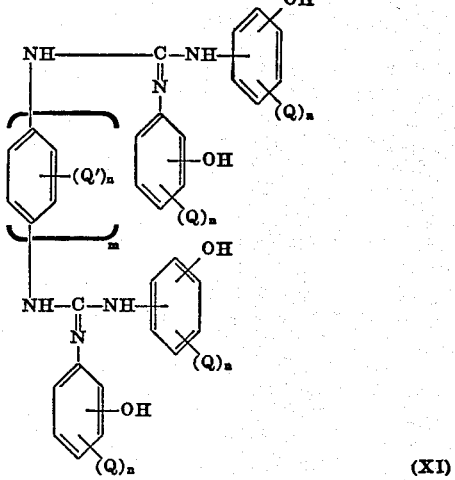

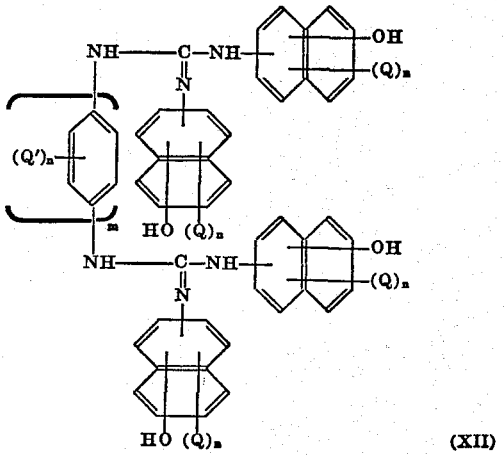

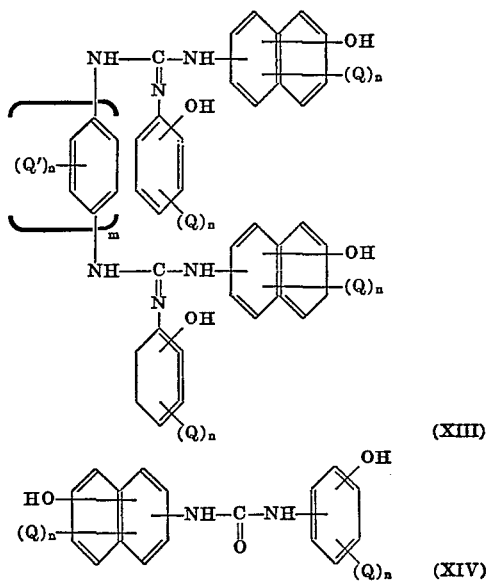

In addition to these compounds (II) to (XIV), compounds in which one or two benzene rings are replaced by one or two oxynaphthalene rings or vice versa are of course effective for the objects of the present invention.

Some of the foregoing compounds are known substances and can be synthesized by known reaction procedures. Namely, the compounds intended by the present invention which are expressed by the formula

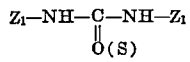

can be prepared by reacting amines of the formula $$Z_1-NH_2$$

with phosgene or thiophosgene. In another procedure, amines of the formula $$Z_1-NH_2$$

are reacted with carbon disulphide and sulphur to form the compounds having the formula

Furthermore, the compounds expressed by the general formula

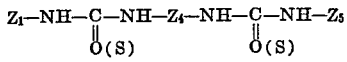

can be obtained by reaction of a mixture of $Z_1-NH_2$, $Z_5-NH_2$ and $H_2N-Z_4-NH_2$ with phosgene or thiophosgene. The compounds expressed by the general formula

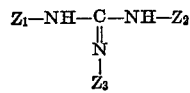

can be prepared by reacting the compounds of the general formula

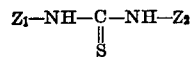

with PbO in the presence of amines having the formula $Z_3-NH_2$.

The compound of Formula I is structurally very characteristic in that it has a plurality of hydroxyl-containing aromatic rings separated by a urea, thiourea or guanidine skeleton. Thus, the compound of the Formula I, when reacted with a diazo compound in the presence of alkali at the time of developing, forms a polyazo dye such as a bisazo dye, trisazo dye and tetrakisazo dye and presents a reproduced image having a vivid blue, red brown or black color with the sharp contrast. Furthermore, the compound of Formula I according to the present invention, because of the above-mentioned characteristic, is very stable in chemical structure and remarkably good in fastness to sunlight and resistance to oxidation as compared with the known azo coupling agents for copying which contain a plurality of oxy groups within a single aromatic ring. In fact, when the compounds of the present invention are used as azo coupling components in a diazo-type copying, both a background (white part) and an image of the resulting copy are substantially not discolored even when left for a long time under irradiation of sunlight or other light or under no irradiation.

In the course of our research work which finally led to the present invention, the following interesting findings were developed.

No means has heretofore been known in the art to determine an azo coupling component which in a diazo-type copying process gives a copy whose background and reproduced image are discolored under irradiation of sunlight and other light or under no irradiation, and those skilled in the art have selected azo coupling components having good sunlight fastness and oxidation resistance merely based on their experiences. It has, however, been discovered that the sunlight fastness and oxidation resistance of the background and reproduced image of a copy are closely related to the reactivities of azo coupling components in a nitrosation reaction and a diazotizing reaction, and that azo coupling components which undergo a nitrosation or diazotization reaction give a copy whose background and reproduced image are liable to discoloration. The compounds of Formula I of the invention having a urea, thiourea or guanidine skeleton do not substantially undergo a nitrosation reaction. They are remarkably excellent in view of the fact that compounds of a similar structure, for instance, oxy aromatic compounds having an imine skeleton (—NH—), a hydrazine skeleton (—NHNH—), —NHCH$_2$CONH— skeleton, or

—NHCH$_2$CH$_2$NH— skeleton readily undergo a nitrosation reaction.

The azo coupling components according to the present invention do not substantially have an ultraviolet ray absorbability. The known azo coupling components generally have a large propensity for absorption of ultraviolet rays. When it is desired to produce a copy from another copy already produced by using the known azo coupling components, the azo coupling components adhered to the background absorb ultraviolet rays from the light source, and therefore, the reproduced image has a dull contrast and a satisfactory copy cannot be obtained. On the contrary, the azo coupling components of the present invention do not substantially absorb ultraviolet rays, and so it is very easy to produce a copy from an already obtained copy.

Furthermore, the known coupling components have a large reactivity with iron ions, and a copy is contaminated by the iron ions which come in during the production of copying paper, during copying operation and also during the use of the copy. For preventing the contamination, a special iron ion blocking agent must be used, but the use of such agent itself has not yet proved fully effective. The coupling components of the present invention, however, can effectively prevent such contamination even without an iron ion blocking agent.

The compounds of Formula I used in the present invention can be easily dissolved in an aqueous medium or an alkaline aqueous medium with or without introduction of a soluble group such as a sulphonic acid group. In addition, as a dye formed at the time of developing is a polyazo dye having macromolecules, it is completely insoluble in water even if the azo coupling component has a soluble group such as a sulphonic acid group.

Furthermore, the compounds of Formula I according to the present invention, when combined with a wide range of diazonium salts, can form a vivid reproduced image with a sharp contrast, by any developing method such as a dry, wet or heat developing method.

In summary, the above-described azo coupling components of the general Formula I according to the present invention have the following excellent characteristics over the known coupling components used heretofore in a diazo-type copying.

(1) It is possible to form a image having a vivid blue, red, brown or black color with a sharp contrast.

(2) The background and reproduced image of the resulting copy are not discolored when preserved for a long time under irradiation of light or under no irradiation.

(3) Even when the coupling component is made sufficiently water-soluble, a dye formed at the time of developing is not likely to be dissolved in water.

(4) The coupling components of the invention can be combined with a wide range of diazonium salts, and are usable in any developing method.

(5) The azo coupling components of the invention do not substantially absorb ultraviolet rays.

(6) There is substantially no contamination by iron ions present as impurities.

In the present invention the compounds of Formula I can be used as an azo coupling component singly or in mixture of two or more. It would be obvious to those skilled in the art that when it is desired to obtain a deep color, a mixture of two or more compounds can be used.

In the present invention, the compounds of the general Formula I can be used as an azo coupling component in accordance with various recipes. For instance, the compounds of Formula I can be used an an azo coupling component in a developer or can be applied to a photosensitive surface of a material base on paper, plastics, fibrous cloth, non-woven cloth or metal.

Several examples of the recipes will be described below.

(A) One-component type developer for use in a wet method:

| | Percent |
|---|---|
| Azo coupling component of the present invention | 0.2–5.0 |
| Alkali agent | 0.5–10.0 |
| (Reducing agent) | 0–20.0 |
| (Surface active agent) | 0–0.5 |
| Water | Remainder |

A photosensitive sheet having a photosensitive surface consisting of a diazo compound and an organic acid can be exposed to light to form a reproduced image, and the foregoing developer coated thereon by an immersion method, a roller coating method, or a spray method to develop the image. As the alkali agent, alkali carbonate, alkali bicarbonate, borax, alkali tetraborate and alkali phosphates and alkali biphosphates are useable. The reducing agent including sodium thiosulphate and thiourea. The usable surfactants are saponin and commercially available anionic, nonionic and cationic surfactants.

(B) Two-component type photosensitive agent for use in a wet method:

| | Percent |
|---|---|
| Azo coupling component of the present invention | 0.2–5.0 |
| Diazo compound | 0.2–5.0 |
| Organic acid | 0.1–5.0 |
| Extender | 0–2.5 |
| Stabiliser | 0–5.0 |
| Coloring matter | 0.001–0.025 |
| Solvent | Remainder |

The photosensitive agent of the foregoing recipe can be coated on a substrate such as paper, and dried to form a photosensitive sheet. This photosensitive sheet is exposed to light to form a reproduced image, and then contacted with an aqueous developer containing an alkali agent. As the organic acid, such water soluble organic acids as citric acid, tartaric acid, oxalic acid, acetic acid and succinic acid can be used. The extender includes dextrin, gum arabic, colloidal silica, casein, gelatin, PVA and poly(vinyl acetate)emulsion. For preventing decomposition of the diazonium salt, sodium naphthalenetrisulphonate, sodium toluolsulphonate. Glauber's salt, and magnesium sulphate may be used. Water is preferable as the solvent. For the purpose of clearly indicating a photosensitive surface and emphasize the whiteness of the background, such coloring matter as Patent Blue, methylene blue and Alizarine Saphirol can be used.

(C) Photosensitising agent for use in a dry method developing:

| | Percent |
|---|---|
| Azo coupling component of the present invention | 0.2–5.0 |
| Diazo compound | 0.2–5.0 |
| Organic acid | 0.1–5.0 |
| Coloring matter | 0.001–0.025 |
| Developing accelerator | 1.0–10.0 |
| Extender | 0–2.5 |
| Solvent | Remainder |

A photosensitising agent of the foregoing recipe can be coated on a substrate such as paper and dried to make a photosensitive sheet. This photosensitive sheet was exposed to light to form a reproduced image, and contacted with a vapour of aqueous ammonia to effect the developing. As the brightening adjuvant, zinc chloride and magnesium chloride, for instance, are used. Examples of the developing accelerator are polyhydric alcohols such as glycerine, ethylene glycol, pentaerythritol, di- and triethylene glycol, allyl compounds such as allythiourea, and urethane.

(D) Photosensitising agent for use in a thermo developing:

| | Percent |
|---|---|
| Azo coupling component of the invention | 0.2–5.0 |
| Diazo compound | 0.2–5.0 |
| Organic acid | 0.1–5.0 |
| Alkali agent | 0.1–5.0 |
| Coloring matter | 0.001–0.025 |
| Extender | 0–2.5 |
| Solvent | Remainder |

A photosensitising agent of the foregoing recipe can be coated on a substrate such as paper, and dried to form a photosensitive sheet. This photosensitive sheet is exposed to light to form a reproduced image. Thereafter, it is heated at a temperature, for instance, of 110–150° C. to effect the developing of the image. In this recipe, an acid volatilizable at the foregoing temperatures is used as the organic acid.

The diazo compounds usable in this invention in conjunction with the azo coupling components of the invention may be any diazo compounds capable of being coupled with oxy aromatic compounds. The diazo compounds suitable for the objects of the present invention are as follows:

PARAPHENYLENE DIAMINE N,N-SUBSTITUTED COMPOUNDS

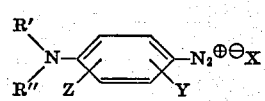

(X: anion
R' and R": aliphatic groups
Z and Y: groups capable of being introduced into a benzene nucleus)

4-diazo-N,N-dimethylaniline (MA salt for short)
4-diazo-N-ethyl-N-β-hydroxyethyl aniline (EH salt for short)
4-diazo-N,N-bis-β-hydroxyethyl aniline 4-diazo-N-methyl-N-β-hydroxyethyl aniline
4-diazo-N-methyl-N-β-hydroxyethyl aniline
4-diazo-N-ethyl-N-β-hydroxypropyl aniline (Other paraphenylene diamine diazonium salts which are N-mono-or N,N-substituted with an alkyl or hydroxyalkyl group)

4-diazo-N-ethyl-N-(β-diethylamino)-ethyl aniline
4-diazo-2-chloro-N,N-diethyl aniline
4-diazo-2-methyl-N,N-diethyl aniline
4-diazo-2-iodo-N,N-diethyl aniline
4-diazo-2-trifluoromethyl-N,N-diethyl aniline
4-diazo-N-ethyl-N-benzyl aniline
4-diazo-N-methyl-N-benzyl aniline (methylbenzyl for short)

AMINO HYDROQUINONE ETHERS

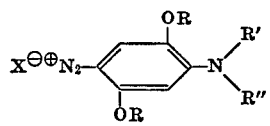

(R, R' and R": alkyl or aryl groups)

4-diazo-2,5-dibuthoxy-N,N-diethyl aniline
4-diazo-2,5-diethoxy-N-benzoyl aniline (BB salt for short)
4-diazo-2,5-diethoxy-N-ethyl-N-benzoyl aniline
4-diazo-2,5-dibenzyloxy-N-benzoyl aniline
4-diazo-2-chloro-5-methoxy-N-benzoyl aniline
4-diazo-2,5-diethoxy-N-benzoyl-methyl aniline
4-diazo-2,5-diethoxy-N-benzoyl-oxymethyl aniline Other 4-diazo-2,5-dioxyalkyl (or dioxyaryl)-N-alkyl (or aryl) compounds and derivatives thereof

AMINODIPHENYLS, AMINODIPHENYLAMINES AND ANALOGOUS COMPOUNDS

X⊖⊕N₂—R—A—R'
and
X⊖⊕N₂—R—A—R'—N₂⊕⊖X diarylamine [A: —NH—]
diphenyl [A: —NH—]
diphenyl [A: Single bond]
diphenyl oxide [A: —O—]
diaryl methane [A: —CH₂—]
stilbene [A: —CH=CH—]
diaryl or aryl alkylsulphides [A: S]

Para-diazo-diphenylamine
4-diazo-2,5,4'-triethoxy diphenylamine
4-diazo-2,5,4'-triethoxy diphenyl
4,4'-bisdiazo-2,2',5,5'-tetrahydroxy diphenyl methane
Bisdiazo-3,3'-dichloro-5,5'-dimethoxy benzidine
4-diazo-2,5-dimethoxyphenyl ethyl sulphide
4-diazo-2,5-diethoxy-4'-methyl-diphenyl-sulphide

DERIVATIVES OF HETEROCYCLIC AMINES

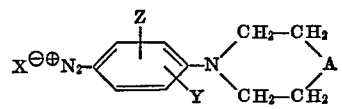

morpholine type compounds (A: O)
thiomorpholine type compounds (A: S)
phenyl piperidine (A: methylene group)
phenyl pyrrolidine (A: single bond)

4-diazo-2,5-dibuthoxy-N-phenyl morpholine
4-diazo-2,5-diethoxy-N-phenyl morpholine
4-diazo-2-methoxy-N-thiomorpholine
4-diazo-N-phenyl piperidine
4-diazo-N-phenyl-pyrrolidine
4-diazo-2,5-di-n-buthoxy-N-phenyl piperidine Other 4-diazo-N-phenyl heterocyclic amine derivatives

DERIVATIVES OF N,N'-SUBSTITUTED ORTHO-PHENYLENE DIAMINES AND DERIVATIVES OF ORTHOAMINO PHENOLS 2-diazo-4-methylmercapto-N,N'-dimethyl aniline
2-diazo-5-benzoylamino-N,N'-dimethyl aniline
2-diazo-1-naphthol-5-sulphonic acid The foregoing diazo compounds are used as relatively stable diazonium salts in the form of sulphates or hydrochlorides or as double salts with such a compound as zinc chloride, tin chloride and aluminum sulphate. Aryl sulphonates may be used as a stabilizing agent for the diazo compounds.

Specific examples of the azo coupling components used in the present invention are given below.

(1) N,N',N" - tris - [1 - oxy - 3 - sulpho - naphthyl-(6)]-guanidine

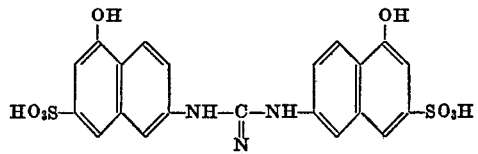

(2) N - [1 - oxy - naphthyl - (8)] - N',N" - bis - [1-oxy-naphthyl-(6)]-guanidine

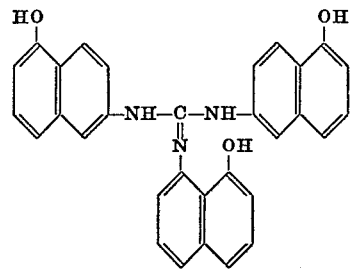

(3) N,N',N"-tris-[2-oxy-naphthyl-(7)]-guanidine

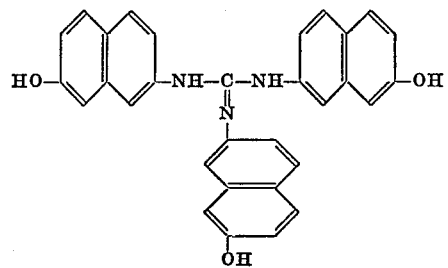

(4) N - 2 - oxyethyl - N',N" - [1 - oxy - 3 - sulpho-naphthyl-(6)]-guanidine

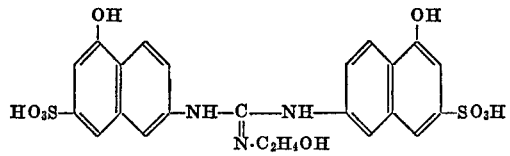

(5) N,N' - bis - [1 - oxy - 3 - sulpho - naphthyl - (6)]-guanidine

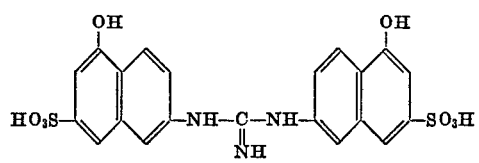

(6) N,N'-bis-[1-oxy-3-sulpho-naphthyl-(6)]-thiourea

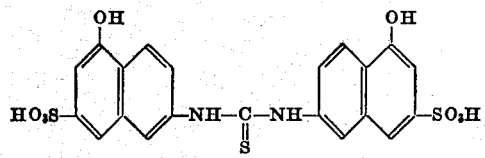

(7) N,N'-bis-[1-oxy-3-sulpho-naphthyl-(6)]-urea

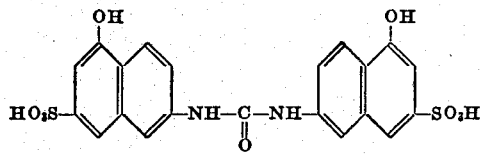

(8) N,N'-bis-[1-oxy-phenyl-(3)]-thiourea

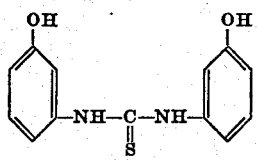

(9) N,N',N''-tris-[1-oxy-phenyl-(3)]-guanidine

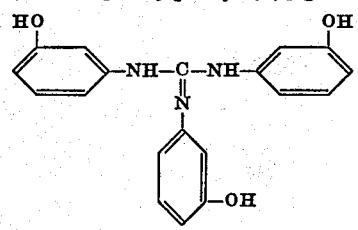

(10) 4,4' - bis - {N',N'' - bis - [1 - oxy - phenyl - (3)]-guanidino}-diphenyl

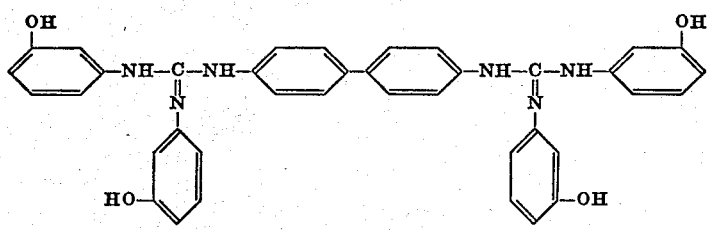

(11) 4,4' - bis - {N',N'' - bis - [1 - oxy - 3 - sulpho-naphthyl-(6)]-guanidino}-3,3'-dimethoxy-diphenyl

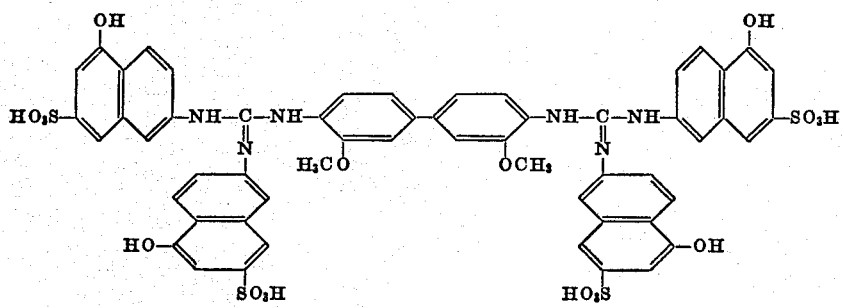

The present invention will further be described in detail with reference to the following examples. It is to be understood that these examples are merely for the illustration of the present invention and are not intended in any way to restrict the scope of the invention.

Example 1

A photosensitising coating solution (1000 cc.) was prepared by dissolving 10.0 g. of a 4-diazo-2,5-diethoxy-benzoyl aniline/½ ZnCl₂ double salt, 8.0 g. of citric acid and 0.1 g. of Patent Blue successively into water. The solution was filtered, and then coated by means of an air knife coater on a thick paper, followed by drying to get a diazo photosensitive paper for a wet-method developing.

A manuscript was superposed on the photosensitive paper, exposed to a mercury lamp and then immersed in a developer of the following recipe.

DEVELOPER RECIPE

| | Grams |
|---|---|
| N,N',N''-tris-[1-oxy-3-sulpho-naphthyl-(6)]guanidine | 20.0 |
| 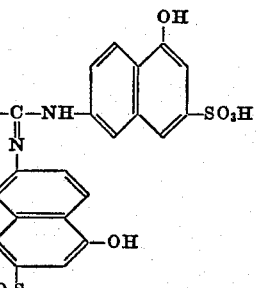 | |
| Sodium carbonate | 30.0 |

These compounds were dissolved in water to adjust the total amount to 100 cc. The obtained copy had a vivid image of deep navy-blue sharply contrasted in a white background. The development of deep navy-blue was difficult according to the conventional wet method. The obtained copy also had excellent resistance to air oxidation, ligh fastness and waterproofness.

Example 2

A diazo photosensitive paper for a wet-method developing was prepared in the same manner as in Example 1. A manuscript was superposed on the photosensitive paper, and exposed to light. A developer of the following recipe was coated on it by a roller.

DEVELOPER RECIPE

| | Grams |
|---|---|
| N-(oxy-8-naphthyl)-N',N''-bis-[1-oxy-naphthyl-(6)]-guanidine | 15.0 |

(structure shown)

| | |
|---|---|
| Sodium carbonate | 20 |
| Sodium triphosphate | 10 |

These compounds were dissolved in water to adjust the total amount to 1000 cc. A copy having a vivid image of deep navy-blue sharply contrasted in a white background was obtained. It had excellent resistance to air oxidation, light fastness, and waterproofness.

Example 3

A diazo photosensitive paper for a wet-method developing was prepared by coating a solution in 1000 cc. of water of 17.5 g. of a 4-diazo-2,5-diethoxy-1-morpholino benzene/½ ZnCl$_2$ double salt, 20 g. of sodium 1,3,6-naphthalenetrisulphonate, 15 g. of citric acid and 0.1 g. of Patent Blue, followed by drying in the same manner as in Example 1. A manuscript was superposed on the photosensitive paper, and exposed to a fluorescent lamp, followed by developing with the use of a developer of the following recipe.

DEVELOPER RECIPE

| | Grams |
|---|---|
| N-(1-oxy-8-naphthyl)-N',N''-bis-[1-oxy-naphthyl-(6)]-guanidine | 15.0 |

(structure shown)

| | |
|---|---|
| Potassium carbonate | 30 |
| Sodium hydroxide | 5 |

These compounds were dissolved in water to adjust the total quantity to 1000 cc. A vivid image of navy-blue which had been unobtainable heretofore with a diazo photosensitive paper of this kind was obtained. The obtained copy had excellent light fastness, resistance to oxidation and waterproofness.

Example 4

A diazo photosensitive paper for a dry-method developing was prepared in the same manner as in Example 1 by coating 1000 cc. of a solution which had been prepared by dissolving in water 10.0 g. of a 4-diazo-N-ethyl-N'-hydroxyethyl aniline/½ ZnCl$_2$ double salt, 15 g. of N-2-oxyethyl-N',N''-bis-[1-oxy-3-sulpho-naphthyl-(6)]-guanidine of the following formula

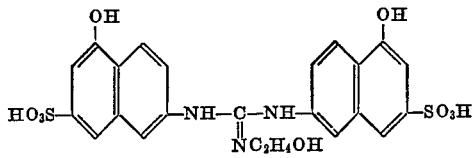

20 g. of citric acid, 30 g. of ZnCl$_2$, 50 g. of ethylene glycol and 0.15 g. of alizarine dye, and then drying. A manuscript was then superposed on the so-obtained photosensitive paper, and exposed to a mercury lamp, followed by developing with a vapour of aqueous ammonia. A copy having a vivid image of deep navy-blue sharply contrasted in a white background was obtained. The image and background had excellent resistance to air oxidation, fastness to light, and waterproofness unobtainable by the conventional dry method.

Example 5

A photosensitising coating solution (1000 cc.) was prepared by dissolving 12.0 g. of a 4-diazo - N,N' - diethyl aniline/½ ZnCl$_2$ double salt, 14 g. of N,N'-bis[1-oxy-3-sulpho-naphthyl-(6)]guanidine of the following formula

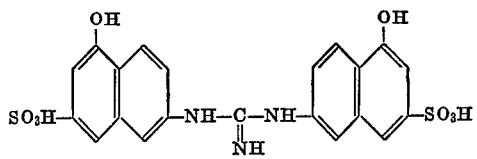

50 g. of diethylurea, 20 g. of tartaric acid, and 0.1 g. of Patent Blue successively in water. The solution was filtered, and then coated on paper, followed by drying at 60–80° C. to get a photosensitive paper.

A manuscript was superposed on the so prepared photosensitive paper, and heated at 130–140° C. A copy having a vivid image of deep blue sharply contrasted in a white background, which had excellent fastness characteristics was obtained.

The diazo photosensitive paper for the thermo-method developing could be preserved for a longer time than in the conventional one because precoupling between the diazonium salt and the azo coupling component hardly occurred.

Example 6

Twenty (20) grams of a styrene/maleic acid copolymer (DAC–2000 A, trade name of the product of Tokushima Oil Refining, Japan) were dissolved into 800 cc. of methanol, followed by successive addition of 9.0 g. of a 4-diazo - 2 - ethoxy-N-benzyl-N'-methyl-aniline/½ zinc chloride double salt as the photosensitive material, 5 g. of N,N'-bis-[1-oxy-3-sulpho-naphthyl(6)]-urea of the following formula

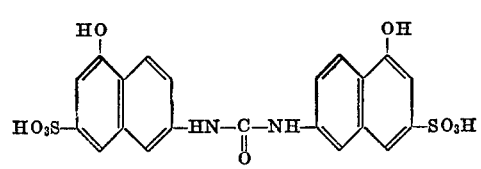

8 g. of citric acid as the organic acid, and 0.1 g. of methylene blue as the colouring matter, and finally of methanol to adjust the total amount to 1000 cc. The photosensitizing solution obtained was coated on a polyester film by a rod coater and dried with hot air at relatively low temperatures to thereby give a photosensitive film.

A manuscript was superposed on the so-obtained photosensitive film, and exposed, followed by developing with a vapour of an aqueous ammonia. A copy having a beautiful image of deep blue on the film ground was obtained. Owing to the characteristics of a polyester film, it was good in dimensional stability, being free from shrinkage. It was also excellent in light fastness and waterproofness.

Example 7

A tracing paper was coated with a photosensitising solution which was the same as the solution prepared in Example 6 except that it contained 4.5 g. of N,N'-bis-[1-oxy-phenyl(3)]-thiourea of the formula

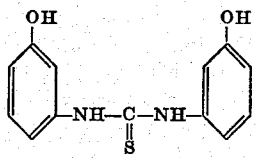

instead of the N,N'-bis-[1-oxy-3-sulpho-naphthyl(6)]-urea used as the azo coupling component in Example 6, and dried to form a photosensitive paper. A manuscript was superposed on the so-obtained photosensitive paper, and exposed, followed by developing with a vapour of aqueous ammonia. A second original copy having a deep yellowish brown image was obtained.

The second original copy (intermediate original) was used as a manuscript, and superposed on ordinary photosensitive paper, followed by exposure and developing to make a number of copies from it. The base and image of the second original copy were hardly discolored, as compared with the conventional second original, and the vividness of the final copies was not deteriorated.

Example 8

The same photosensitising solutions as used in Example 1 were coated on a semi-transparent paper to form a photosensitive paper for a wet-method second original. A manuscript was superposed on the photosensitive paper, and exposed, followed by developing with a developer of the following recipe by a roll coating procedure.

DEVELOPER RECIPE

|  | Grams |
|---|---|
| N,N',N''-tris-[1-oxy-phenyl(3)] | 12.0 |
| Potassium carbonate | 25.0 |

These compounds were dissolved in water to adjust the total amount to 1000 cc. The image of the obtained copy was deep reddish orange in a white background. Even when it was repeatedly used as a second original as in Example 7, it was not discolored. Unlike the conventional wet-method developing procedure, it was possible to prevent the yellowing of the non-image portion, and the obtained final copy was vivid.

Example 9

A photosensitive paper for both wet and dry methods was prepared by coating paper, by the same method as used in Example 1, with 1000 cc. of a solution in water of 10.5 g. of a 4-diazo-N,N'-diethyl-2-chloroaniline/½ zinc chloride double salt, 7 g. of 4,4'-bis{N',N''-[1-oxy-phenyl(3)]guanidino}diphenyl of the following formula

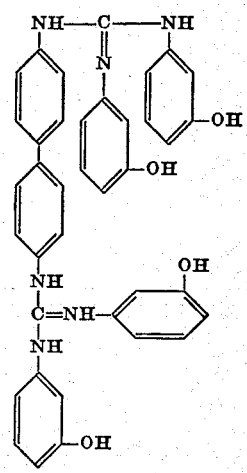

18.0 g. of citric acid, and 0.1 g. of Patent Blue, followed by drying. A manuscript was superposed on the photosensitive paper obtained and exposed. In the dry method, it was developed with a vapour of aqueous ammonia, and in the wet method, it was developed with an aqueous solution containing 3% of sodium carbonate. In either case, a copy having an image of deep brown sharply contrasted in a white background was obtained. The obtained copy had excellent resistance to air oxidation, waterproofness and fastness to sunlight, which properties were unobtainable by the conventional process.

Example 10

A manuscript was superposed on the same photosensitive paper as used in Example 1 and exposed, followed by developing with a developer of the following recipe.

DEVELOPER RECIPE

|  | G. |
|---|---|
| 4,4'-bis{N',N''-[1-oxy-3-sulphonaphthyl(7)]-guanidine}-3,3'-dimethoxy-diphenyl | 9.0 |
| Sodium carbonate | 20 |
| Sodium bicarbonate | 20 |

These compounds were dissolved in water to adjust the total quantity to 1000 cc. An image with a vivid deep black color which had been unobtainable with the conventional diazo photosensitive paper of this type was obtained. As compared with known black copies developed by a wet method using phloroglucinol or resorcinol as an azo coupling component, the copy obtained according to the present example exhibited a neutral black color free from a reddish or bluish shade in all portions ranging from a half tone to a high density portion. The degeneration of the developer by air oxidation hardly occurred and the yellowing of the background of the copy by light and air was also very scarce. The copy was therefore highly valuable in use.

Comparative example

Table 1 shows the color of the image, the density of the image, the density of the background, the ratio of density between the image and the background, waterproofness and fastness to light of the copies developed by using the azo coupling components in the foregoing examples and the conventional coupling components.

Example 11

The image density and the background density were determined in accordance with Japanese Industrial Standards designated as Z 8722 from the equation $$\text{Density} = \log(100/y)$$

in which Y is a refractive index in percent of a specimen when a refractive index of magnesium oxide is 100.

The waterproofness was determined from the density of the image after immersing the copy for 30 minutes in flowing water at 20° C. The fastness to light was determined from the densities of the image and background after exposure of the copy for 6 hours to a 800 w. mercury lamp.

It is clearly seen from the results given in Table 1 that the copying materials containing the azo coupling components of the present invention are remarkably superior to those containing the known azo coupling components with respect to the color of the copy, the desity of the image, the ratio of density of the image to that of the background, waterproofness and fastness to light.

Copies having a vivid image were obtained in the same manner as in Example 1 except that each of the following compounds was used as the azo coupling component.

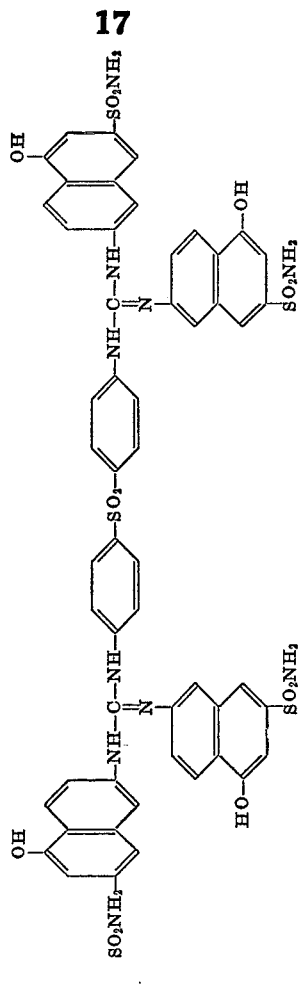

4,4'-bis[N,N'-[1-oxy-3-sulphonamide-naphthyl-(6)]guanidino]diphenyl sulphone

TABLE 1

| Recipes | Main copying material | | Developing method | Colour of image | Tests of— | | | | | | |
|---|---|---|---|---|---|---|---|---|---|---|---|
| | Azo coupling component | Diazonium salt | | | Density of image log(110/Y) (a) | Density of background log(100/Y) (b) | Density ratio (a)/(b) | Waterproofness (image) | | Fastness to light (image) | | Fastness to light (background) | |
| | | | | | | | | After immersion in flowing water log(100/Y) (c) | Ratio of change (percent)[1] | After irradiation of light log(100/Y) (d) | Ratio of change (percent)[2] | After irradiation of light log(100/Y) (e) | Ratio of change (percent)[3] |
| Conventional methods | NW acid | BB salt | Wet | Violet | 1.036 | 0.092 | 11.3 | 0.855 | 17.4 | 0.617 | 40.5 | 0.207 | 125.0 |
| | 2,3-dioxy-6-sulphonic acid | EH salt | Dry | Blue | 1.207 | 0.107 | 11.2 | 0.705 | 41.6 | 0.758 | 37.2 | 0.193 | 80.5 |
| | Resorcinol | MA salt | Dry | Brown | 1.212 | 0.113 | 10.6 | 1.111 | 8.4 | 0.741 | 38.9 | 0.316 | 182.0 |
| | Phloroglucinol | Tolyimercapto ethoxy | Wet | Black | 1.105 | 0.098 | 11.3 | 1.030 | 6.8 | 0.827 | 25.1 | 0.187 | 91.0 |
| | Biguanidino oxynaphthoic acid | Ethoxymorpholine | Wet and dry | Blue | 0.923 | 0.123 | 7.5 | 0.851 | 7.8 | 0.780 | 20.9 | 0.211 | 71.5 |
| Methods in which the copying material of the present invention is used; Example: | Compound | | | | | | | | | | | | |
| 1 | (1) | BB salt | Wet | Navy blue | 1.437 | 0.071 | 20.2 | 1.355 | 5.7 | 1.250 | 13.0 | 0.077 | 8.5 |
| 2 | (2) | do | Wet | do | 1.418 | 0.073 | 19.4 | 1.392 | 1.8 | 1.218 | 14.1 | 0.081 | 10.9 |
| 3 | (3) | Ethoxy morpholine | Wet | do | 1.302 | 0.081 | 16.1 | 1.210 | 7.1 | 1.060 | 18.6 | 0.094 | 16.0 |
| 4 | (4) | EH salt | Dry | do | 1.465 | 0.069 | 21.2 | 1.365 | 6.2 | 1.240 | 14.8 | 0.075 | 8.7 |
| 5 | (5) | do | Heat | Blue | 1.201 | 0.087 | 12.6 | 1.112 | 7.4 | 1.031 | 14.2 | 0.096 | 11.0 |
| 6 | (6) | Methyl benzyl | Dry | do | 1.296 | 0.065 | 19.9 | 1.225 | 5.5 | 1.105 | 14.7 | 0.071 | 9.2 |
| 7 | (7) | do | Dry | Yellow brown | 1.251 | 0.071 | 17.7 | 1.216 | 2.8 | 1.060 | 15.3 | 0.080 | 12.6 |
| 8 | (8) | BB salt | Wet | Red orange | 1.481 | 0.075 | 19.8 | 1.430 | 3.4 | 1.275 | 13.9 | 0.082 | 9.3 |
| 9 | (9) | Diethyl chloroaniline | Wet and dry | Brown | 1.501 | 0.084 | 17.8 | 1.445 | 3.7 | 1.325 | 11.7 | 0.095 | 13.1 |
| 10 | (10) | BB salt | Wet | Black | 1.513 | 0.091 | 16.6 | 1.446 | 4.4 | 1.360 | 10.2 | 0.097 | 6.6 |

[1] $\frac{(a)-(c)}{(a)} \times 100$;  [2] $\frac{(a)-(d)}{(a)} \times 100$;  [3] $\frac{(e)-(b)}{(b)} \times 100$ NOTE.—The recipes for the conventional methods are in accordance with those given in the examples.

4,4' - bis{N,N' - [1 - oxy - 3 - methoxy - carbonyl - naphthyl-(6)]guanidino}diphenyl ether
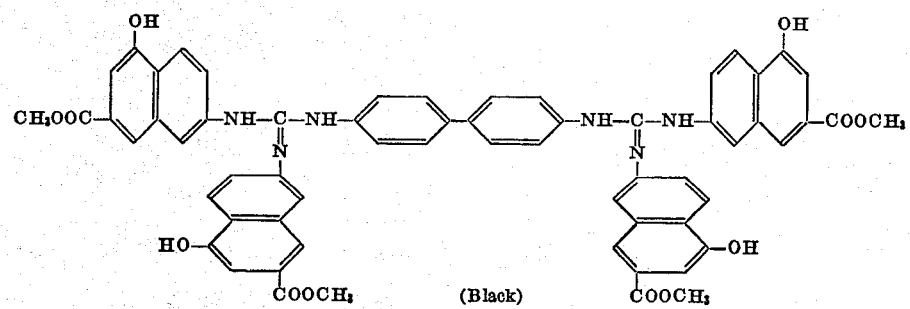
(Black)
4,4' - bis{N,N' - [1 - oxy - 3 - methoxy - naphthyl(6)]guanidino}diphenyl methane
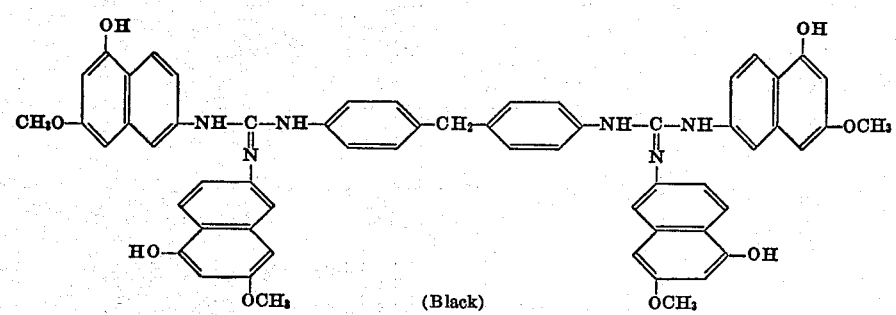
(Black)
N,N',N''-tris[4'-oxydiphenyl(4)]guanidine
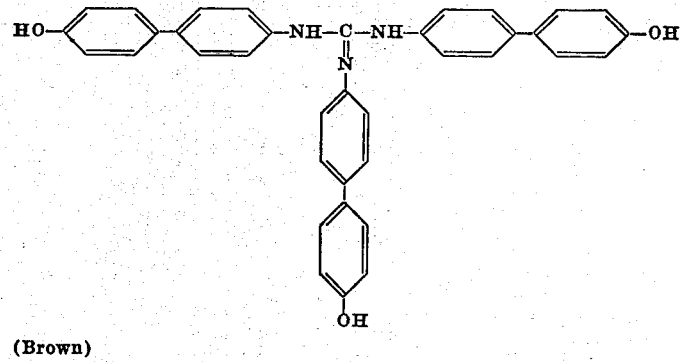
(Brown)
N,N',N'' - tris[8' - oxyanthraquinonyl(1)]guanidine
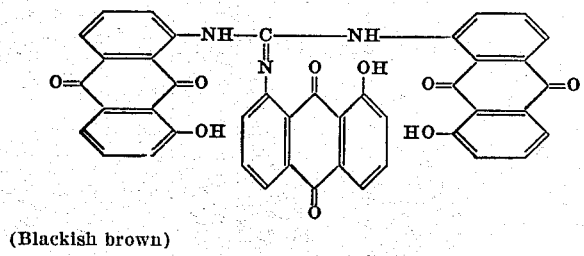
(Blackish brown)
2,6 - bis{N,N' - [1 - oxy - 3 - chloronaphthyl(6)]guanidino}-4-chlorotoluene
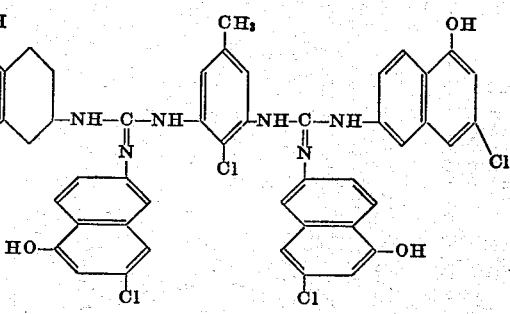
(Black)

4,4' - bis{N,N' - (2 - oxy - 3 - benzoyl naphthyl(6) guanidino}diphenylamine

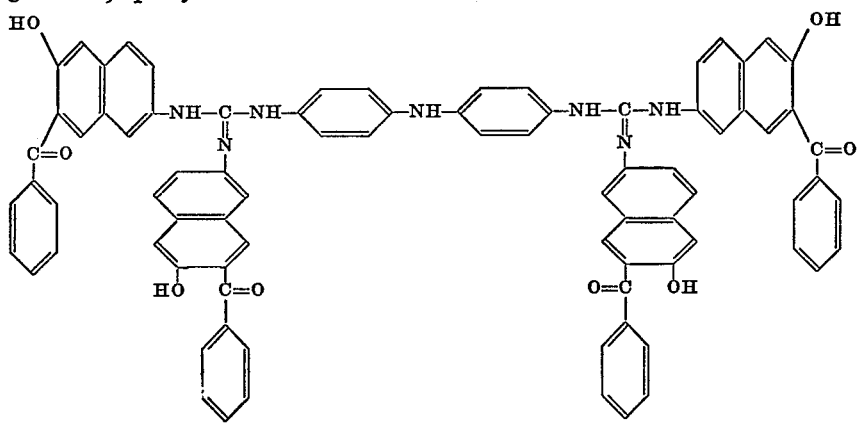

(Black)

N,N',N''-tris[2-oxycarbazole(7)]guanidine

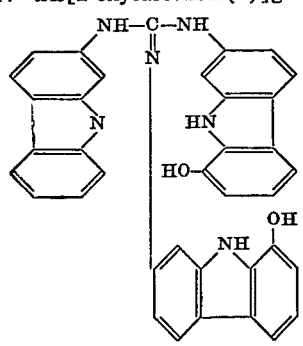

(Blackish brown)

N,N'-bis-[1-oxy-4-methyl-phenyl(5)]thiourea

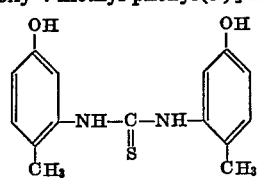

(Yellowish brown)

N,N' - bis - [1 - oxy - 3 - sulpho - napthyl(6)]N'' - [1-oxy-4-fluorophenyl(5)]guanidine

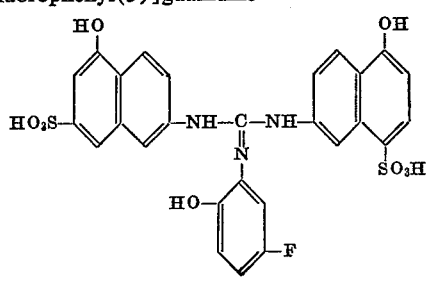

(Yellowish brown)

EXAMPLE 12

Copies having a vivid image were obtained in the same manner as in Example 4 except that each of the following compounds was used as the azo coupling component.

N,N',N''-tris[1 - oxy-3 - sodioxysulphonyl-phenyl(5)]guanidine

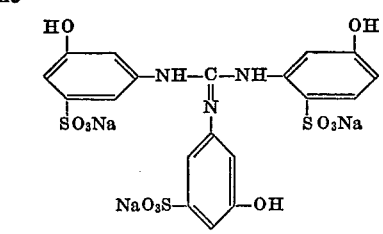

(Brown)

N,N'-bis[1-oxy-3-sulpho - 8 - methylamino-naphthyl(6)]urea

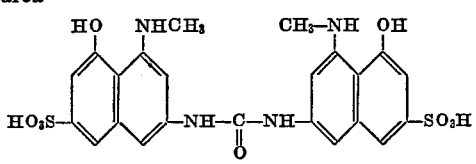

(Blue)

N,N'-bis[1-oxy-3-sulpho - 8 - phenylamino-naphthyl(6)]thiourea

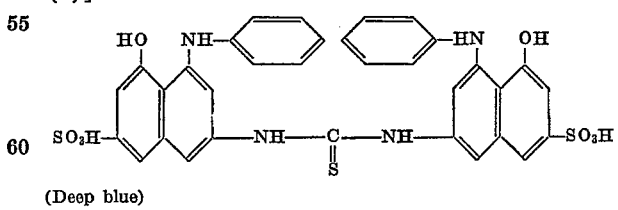

(Deep blue)

N,N'-bis[1-oxy-3-sulpho - 8 - acrylamino-naphthyl(6)]urea

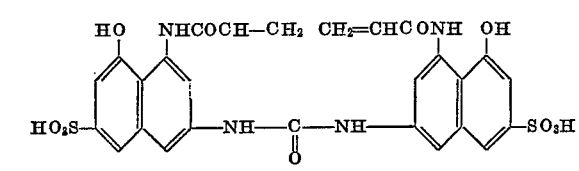

(Deep blue)

4,4'-bis{N,N'-[1 - oxy-3 - sodioxycarbonyl-naphthyl (6)]guanidine}diphenyl ether

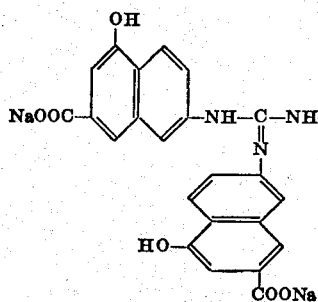

(Black)

What is claimed is:

1. A two-component diazo-type copying material which comprises a support; and a light sensitive layer on said support, said layer comprising a diazonium salt, an azo coupling component and an acidic stabilizer, said azo coupling component being a compound of the formula

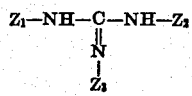

wherein $Z_2$ is
(i) hydroxy aryl group,
(ii) hydroxy aryl group substituted by $SO_3H$, COOH, $SO_3M$, COOM, alkoxy, halogen, suphonamide, or alkoxycarbonyl group, wherein M is an alkali metal or ammonium, or
(iii) a group represented by the formula

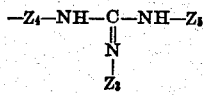

wherein $Z_4$ is (a) an arylene group, (b) an arylene group substituted by $SO_3H$, COOH, $SO_3M$, COOM, alkoxy, halogen or alkyl group, or (c)

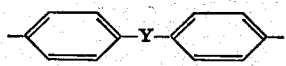

wherein Y is —O—, —$SO_2$—, or —NH—, and M is as defined above; each of $Z_1$ and $Z_5$ is
(i) hydroxy aryl group, or
(ii') hydroxy aryl group substituted by $SO_3H$, COOH, $SO_3M$, COOM, alkoxy, halogen, suphonamide, or alkoxycarbonyl group, wherein M is as defined above; and $Z_3$ is (i'') a hydroxy alkyl group, (ii'') a hydroxy aryl group, or (iii'') a hydroxy aryl group substituted by $SO_3H$, COOH, $SO_3M$, COOM, alkoxy, halogen, sulphonamide, or alkoxycarbonyl group, wherein M is as defined above, with the proviso that when (i), (ii), (b), (i'), (ii'') or (iii'') is an aryl group containing more than one ring, all substituents are located on the rings of the aryl group not directly attached to the guanyl residue.

2. The copying material of claim 1 wherein said azo coupling component is a compound expressed by the following formula

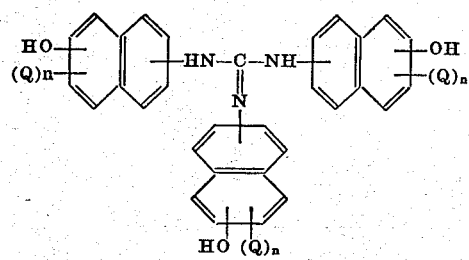

wherein Q is H, —$SO_3H$, —$SO_3M$, —COOH or —COOM, wherein M is an alkali metal or ammonium, and n is 1 or 2.

3. The copying material of claim 1 wherein said azo coupling component is a compound expressed by the following formula

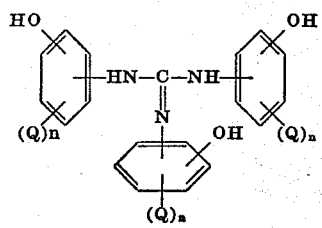

wherein Q is H, —$SO_3H$, —$SO_3M$, —COOH or —COOM, wherein M is an alkali metal or ammonium, and n is 1 or 2.

4. The copying material of claim 1 wherein said azo coupling component is a compound expressed by the following formula

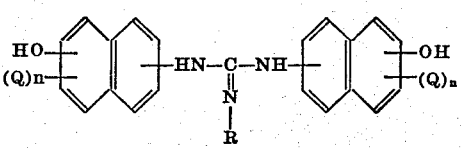

wherein Q is H, —$SO_3H$, —$SO_3M$, —COOH or —COOM, wherein M is an alkali metal or ammonium, R is a hydroxy alkyl group, and n is 1 or 2.

5. The copying material of claim 1 wherein said azo coupling component is a compound expressed by the following formula

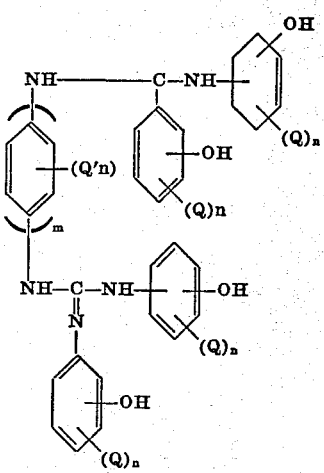

wherein Q' is an oxy group, —$SO_3H$, —$SO_3M'$, —COOH, —COOM', wherein M' is an alkali metal, an alkyl group, or an alkoxy group, Q is H, —$SO_3H$, —$SO_3M$, —COOH or —COOM, wherein M is an alkali metal or ammonium, and m and n are each 1 or 2.

6. The copying material of claim 1 wherein said azo coupling component is a compound expressed by the following formula

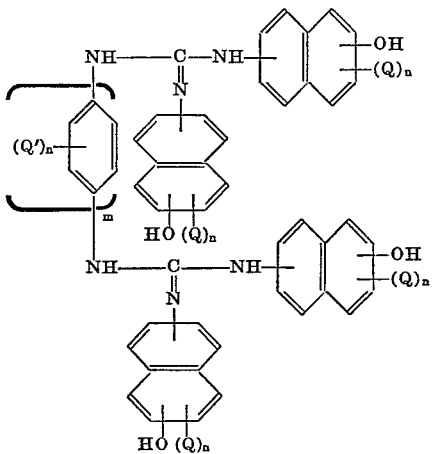

wherein Q' is an oxy group, —$SO_3H$, —$SO_3M'$, —COOM,' wherein M' is an alkali metal, an alkyl group, or an alkoxy group, Q is H, —$SO_3H$, —$SO_3M$, —COOH or —COOM, wherein M is an alkali metal or ammonium, and $m$ and $n$ are each 1 or 2.

7. The copying material of claim 1 wherein said azo coupling component is a compound expressed by the following formula

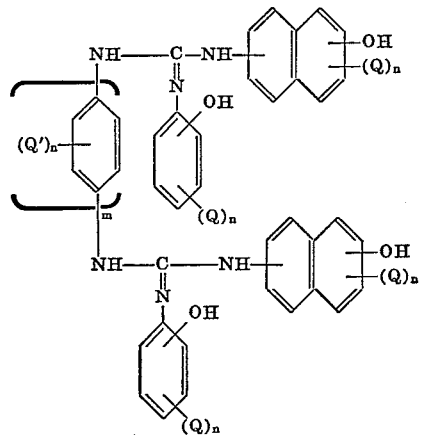

wherein Q' is an oxy group, —$SO_3H$, —$SO_3M'$, —COOM,' wherein M' is an alkali metal, an alkyl group, or an alkoxy group, Q is H, —$SO_3H$, —$SO_3M$, —COOH or —COOM, wherein M is an alkali metal or ammonium, and $m$ and $n$ are each 1 or 2.

8. A two-component diazo-type copying material which comprises a support; and a light sensitive layer on said support, said layer comprising a diazonium salt, an azo coupling component and an acidic stabilizer, said azo coupling component being a compound of the formula

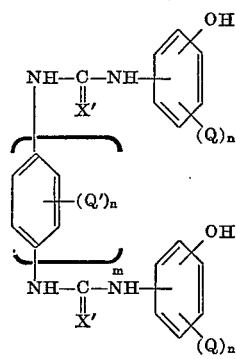

wherein Q' is a hydroxy group, —$SO_3H$, —$SO_3M'$, —COOH, —COOM' wherein M' is an alkali metal, an alkyl group, or an alkoxy group, Q is H, —$SO_3H$, —$SO_3M$, —COOH or —COOM, wherein M is an alkali metal or ammonium, $m$ and $n$ are each 1 or 2, and X' is O or S.

9. A two-component diazo-type copying material which comprises a support; and a light sensitive layer on said support, said layer comprising a diazonium salt, an azo coupling component and an acidic stabilizer, said azo coupling component being a compound of the formula

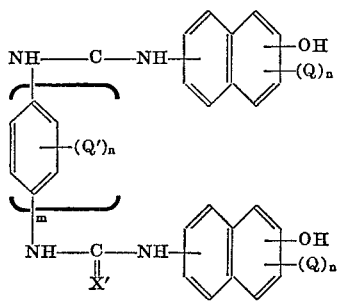

wherein Q' is a hydroxy group, —$SO_3H$, —$SO_3M'$, —COOH, —COOM' wherein M' is an alkali metal, an alkyl group, or an alkoxy group, Q is H, —$SO_3H$, —$SO_3M$, —COOH or —COOM, wherein M is an alkali metal or ammonium, $m$ and $n$ are each 1 or 2, and X' is O or S.

References Cited
UNITED STATES PATENTS

| | | | |
|---|---|---|---|
| 1,822,065 | 9/1931 | Sprongerts et al. | 96—91 X |
| 2,432,549 | 12/1947 | Von Glahn et al. | 96—91 |
| 2,485,122 | 10/1949 | Von Glahn et al. | 96—91 X |
| 2,494,906 | 1/1950 | Slifkin et al. | 96—91 X |
| 2,537,919 | 1/1951 | Slifkin | 96—91 |
| 2,542,715 | 2/1951 | Slifkin | 96—91 |
| 2,551,570 | 5/1951 | Von Glahn et al. | 96—91 |
| 2,617,726 | 11/1952 | Kessels | 96—91 X |
| 3,408,203 | 10/1968 | Sus et al. | 96—91 |

FOREIGN PATENTS

| | | | |
|---|---|---|---|
| 691,283 | 5/1940 | Germany | 96—91 |
| 983,662 | 2/1965 | Great Britain | 96—91 |

CHARLES L. BOWERS, JR., Primary Examiner

U.S. Cl. X.R.

96—49; 260—506, 509, 518, 519, 552, 554, 555, 565

UNITED STATES PATENT OFFICE
CERTIFICATE OF CORRECTION

Patent No. 3,679,420　　　　　　　　Dated July 25, 1972

Inventor(s) TAIZO YOKOYAMA

It is certified that error appears in the above-identified patent and that said Letters Patent are hereby corrected as shown below:

Claim 1, line 46, "(i)" should be --(i')--

Claim 5, the formula should read as follows:

--

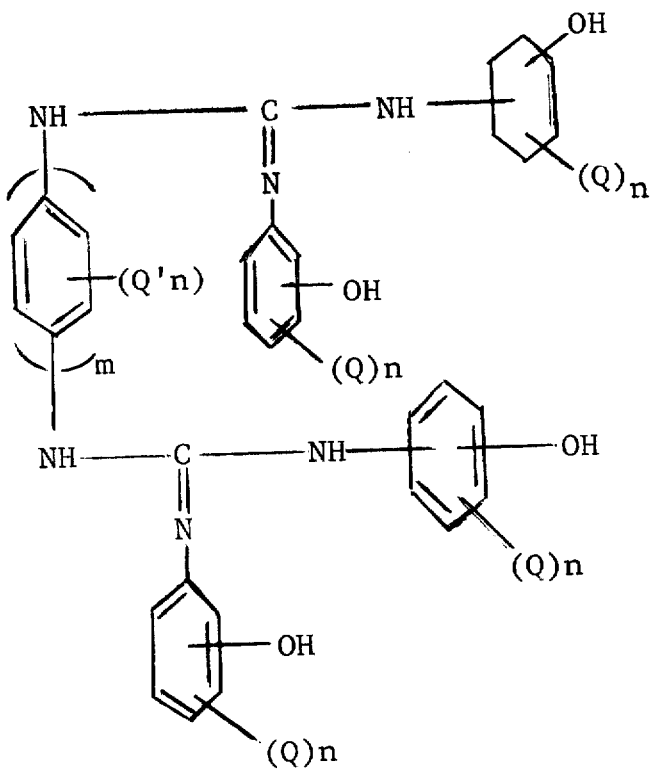

--

Signed and sealed this 30th day of January 1973.

(SEAL)
Attest:

EDWARD M. FLETCHER, JR.
Attesting Officer

ROBERT GOTTSCHALK
Commissioner of Patents